(12) United States Patent
Hata

(10) Patent No.: US 7,449,988 B2
(45) Date of Patent: Nov. 11, 2008

(54) BURGLARPROOF DEVICE FOR VEHICLE

(75) Inventor: Toshiaki Hata, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 181 days.

(21) Appl. No.: 10/663,818

(22) Filed: Sep. 17, 2003

(65) Prior Publication Data

US 2004/0183653 A1 Sep. 23, 2004

(30) Foreign Application Priority Data

Mar. 17, 2003 (JP) ............................ P2003-071668

(51) Int. Cl.
*H04Q 1/00* (2006.01)
(52) U.S. Cl. .................................... 340/5.72
(58) Field of Classification Search ................ 340/5.72, 340/5.64, 825.69, 825.31, 5.62, 5.61; 307/10.3, 307/10.6
See application file for complete search history.

(56) References Cited

U.S. PATENT DOCUMENTS

| | | | | |
|---|---|---|---|---|
| 4,761,645 A * | 8/1988 | Mochida | ..................... | 340/5.62 |
| 5,760,680 A * | 6/1998 | Hwang | .................. | 340/426.17 |
| 5,977,654 A * | 11/1999 | Johnson et al. | ............. | 307/10.3 |
| 6,225,890 B1 * | 5/2001 | Murphy | .................. | 340/426.19 |
| 6,275,141 B1 * | 8/2001 | Walter | ........................ | 340/5.64 |
| 6,580,181 B2 * | 6/2003 | Nagoya et al. | ............. | 307/10.5 |
| 6,827,642 B2 * | 12/2004 | Flick | .......................... | 454/156 |
| 6,876,292 B2 * | 4/2005 | Onuma et al. | ............... | 340/5.62 |

FOREIGN PATENT DOCUMENTS

| | | |
|---|---|---|
| JP | 61-201986 U | 12/1986 |
| JP | 4-15141 B2 | 3/1992 |
| JP | 10-297431 A | 11/1998 |
| JP | 11-62793 A | 3/1999 |
| JP | 2002-37028 A | 2/2002 |
| JP | 2002-67882 A | 3/2002 |
| JP | 2003-011865 A | 1/2003 |

* cited by examiner

*Primary Examiner*—Brian Zimmerman
*Assistant Examiner*—Nabil H Syed
(74) *Attorney, Agent, or Firm*—Sughrue Mion, PLLC

(57) ABSTRACT

The burglarproof device for vehicle includes a portable transmitter having an unlock button for transmitting a preset first ID code, an immobilizer controller for receiving the first ID code from the portable transmitter, and collating the first ID code with a second ID code stored to permit the activation of a handle on the basis of a collation result thereof, and a system relay for permitting an engine operation on the basis of the collation result by the immobilizer controller, or disabling the engine operation on the basis of an operating state of the engine, and a fuel injection controller.

19 Claims, 8 Drawing Sheets

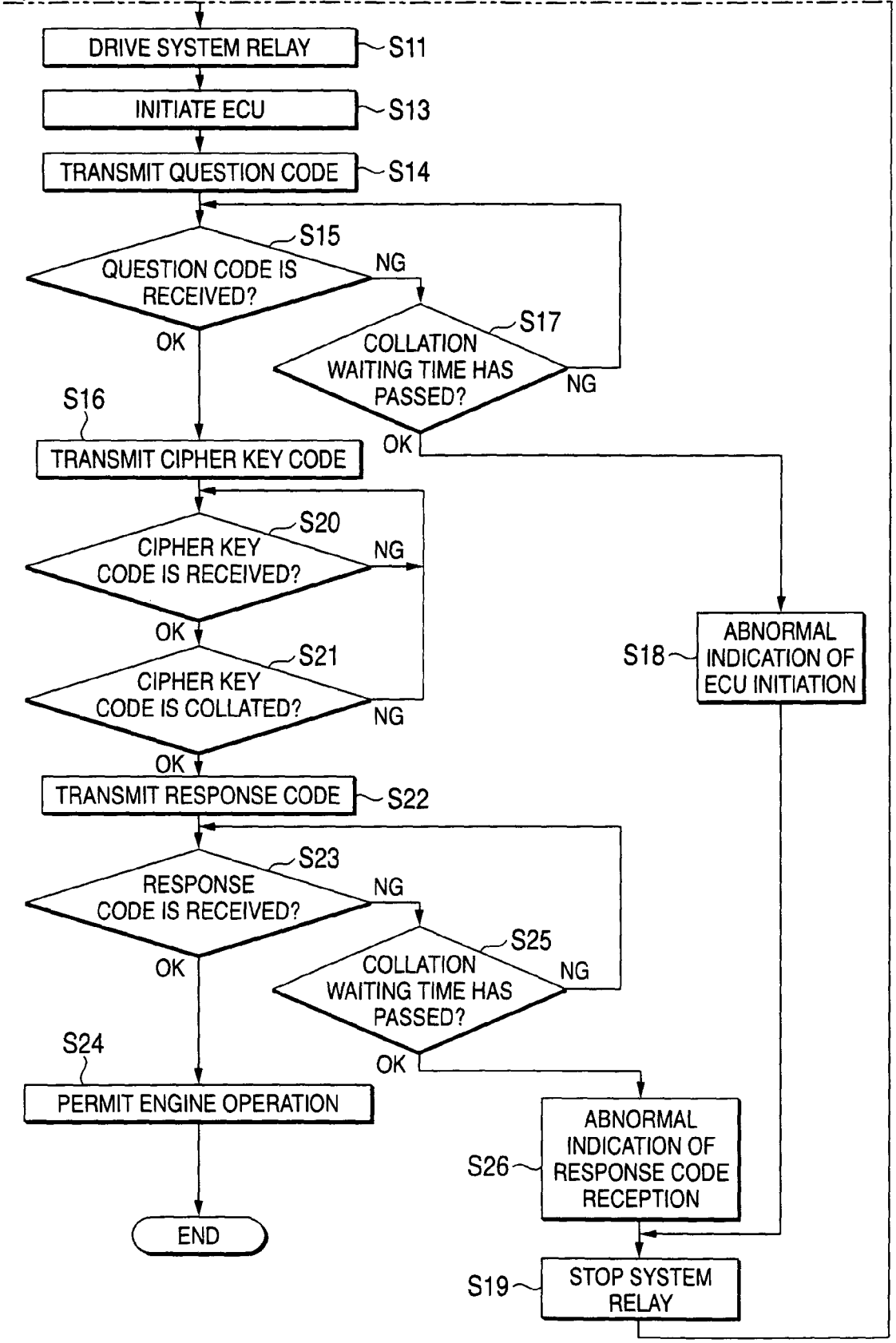

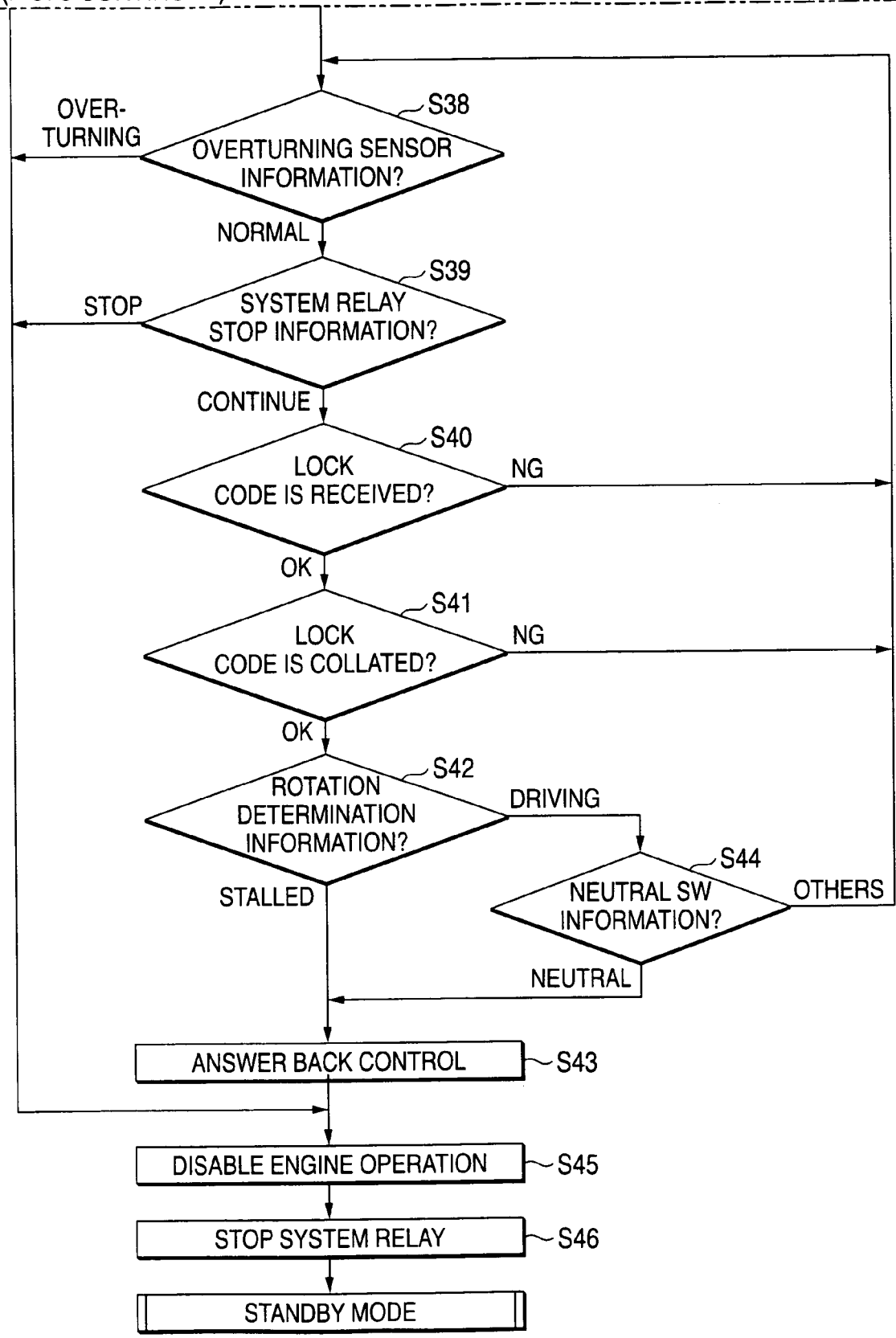

BURGLARPROOF DEVICE FOR VEHICLE

BACKGROUND OF THE INVENTION

1. Field of the Invention

The present invention relates to a burglarproof device for vehicle useful to prevent a burglary in a vehicle propelled by an internal combustion engine such as a car, a two wheeler, a marine vessel or a jet propelled ship.

2. Description of the Related Art

Conventionally, to start an engine for vehicle, a key switch for engine start is mechanically turned on, employing a cylinder key passed to the regular driver of vehicle alone. Accordingly, the engine start is impossible without a regular key, whereby the burglary of the vehicle is prevented. However, even though the vehicle burglary is prevented relying on the key, it is not necessarily possible to fully attain a burglarproof effect because the key is relatively easily duplicated.

Thus, there is a system for enhancing the burglarproof effect, in which the information designating a key for vehicle is sent from the key to the key cylinder, and the key cylinder identifies the sent information and permits the start of engine only if the regular information is identified, as disclosed in JP-B-4-15141, for example.

Specifically, a set of magnetic circuits is provided, consisting of a key coil wound around an axial core inside the key that is placed in proximity to a rotor coil wound around an annular core disposed around the periphery of a key insertion hole in the key cylinder, whereby the information for driving the engine is passed via this set of magnetic circuits between the key and the key cylinder.

However, the conventional burglarproof device for vehicle attained some effect to prevent the burglary of the vehicle, but had a problem of taking a trouble of inserting and turning a key into the key cylinder also serving as an electrical switch. Because of the operation of inserting and turning a key into the key cylinder, it had another problem that the start of engine was not permitted at a location away from the vehicle or a mechanical failure was likely to occur.

Also, when the driver left the vehicle with the key inserted into the key cylinder, no burglarproof unit was provided.

Also, in starting the engine at night, the driver could not see an insertion hole for the key cylinder in the darkness, taking a lot of time to start the engine. To solve this problem, a measure for placing a lamp in the key cylinder may be taken, but especially in the case of cheap two wheelers, it was not preferable that the lamp was installed, because the cost was increased.

Moreover, the design near the driver's seat was aggravated owing to the existence of the key cylinder.

SUMMARY OF THE INVENTION

This invention has been achieved to solve the above-mentioned problems, and it is an object of the invention to provide a burglarproof device for vehicle which can simply permit or inhibit the engine operation at a location away from the vehicle without employing the key by dispensing with the key and the key cylinder.

According to the present invention, a burglarproof device for vehicle includes a portable transmitter having a first switch for transmitting a preset first ID code (Identity Code), vehicle operational device activation determining unit for determining the activation of an operational device for vehicle by receiving the first ID code from the portable transmitter, collating the first ID code with a second ID code prestored to permit the activation of an operational device for vehicle on the basis of a collation result, and engine operation restraining unit for permitting an engine operation on the basis of the collation result by the vehicle operational device activation determining unit, or disabling the engine operation on the basis of an operating state of the engine.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
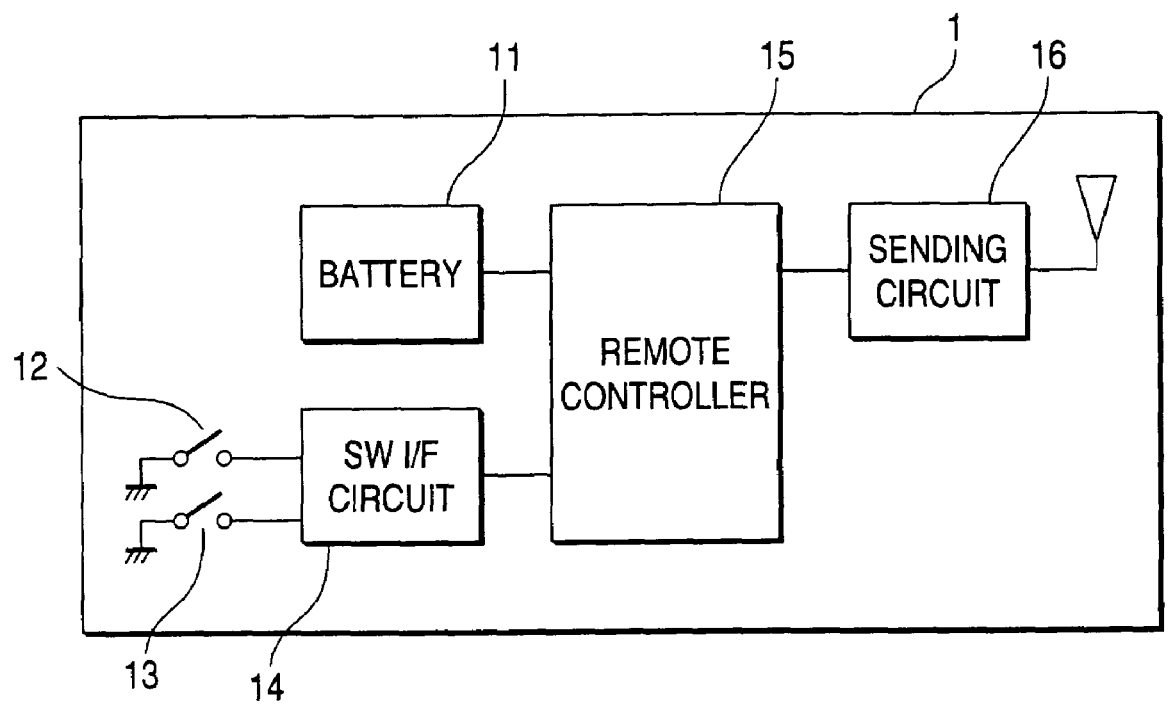
FIG. 1 is a block diagram showing a portable transmitter for use with a burglarproof device for vehicle according to an embodiment of this invention.

One embodiment of the present invention will be described below with reference to the drawings. In this embodiment, a burglarproof device of the invention is applied to a two wheeler. FIG. 1 is a block diagram showing a portable transmitter for use with the burglarproof device for vehicle according to the embodiment of this invention.

In FIG. 1, the portable transmitter 1 includes a battery 11 that is a power source, an unlock button 12 as a first switch for releasing a locked state of a vehicle operational device such as a steering wheel by sending a preset first ID code to the vehicle side, upon a manipulation by the driver, a lock button 13 as a second switch for disabling the engine operation by sending a third ID code to the vehicle side, upon a manipulation by the driver, a switch interface circuit (herein after referred to as an I/F circuit) 14 for shaping the waveform of a sending signal from the unlock button 12 or the lock button 13, a remote controller 15 for remotely controlling the burglarproof device by inputting a signal from this switch I/F circuit 14 and converting the signal, and a sending circuit 16 for sending the signal converted by the remote controller 15 to the vehicle side.

Figure 2:
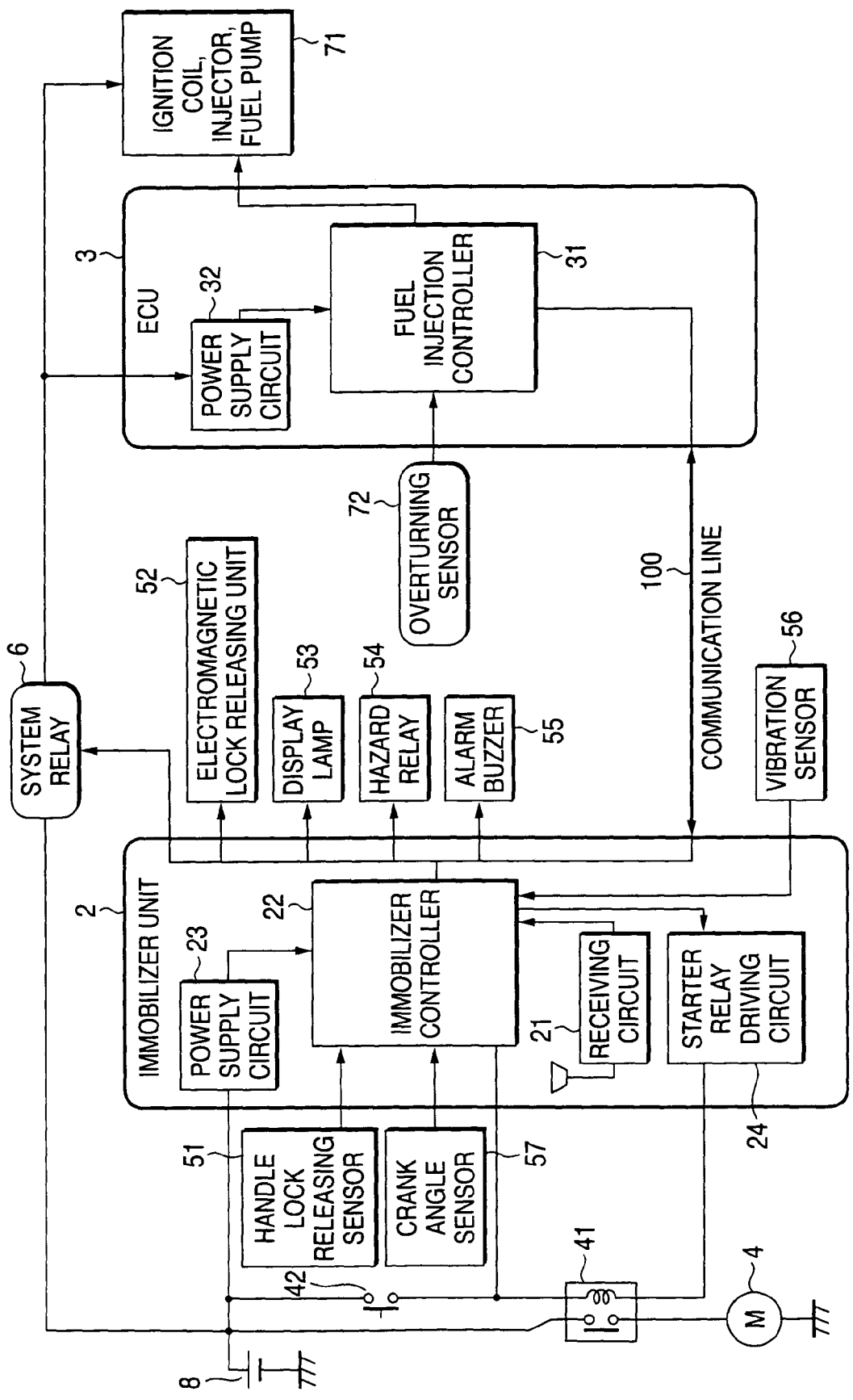
FIG. 2 is a block diagram showing a vehicle mounted device for use with the burglarproof device for vehicle according to the embodiment of this invention.

FIG. 2 is a block diagram showing an immobilizer unit and an ECU for use with the burglarproof device for vehicle according to the embodiment of this invention. In FIG. 2, the immobilizer unit 2 includes a receiving circuit 21 for receiving a first ID code and a third ID code sent from the portable transmitter 1, an immobilizer controller 22 as vehicle operational device activation determining unit for sending a signal of releasing the lock of a steering wheel that is a operational device for vehicle on the basis of a collation result by collating the first ID code received by the receiving circuit 21 with a second ID code previously stored, or disabling the operation of the vehicle on the basis of a collation result by collating the third ID code received by the receiving circuit 21 with a fourth ID code previously stored, a power supply circuit 23 for supplying voltage from a battery 8 to the immobilizer controller 22, and a starter relay driving circuit 24 for driving a starter relay 41 of a starter 4 by accepting an engine start permission from the immobilizer controller 22.

The immobilizer controller 22 is connected to a handle lock releasing sensor 51 for sensing a released handle lock, electromagnetic lock unit 52 for releasing a handle lock, a display lamp 53 for displaying an abnormal release of the handle lock, an abnormal initiation of the ECU 3, or a warning at the time of burglary, a hazard relay 54 for flashing at the time of running permission, or lighting at the time of a burglary to alarm, an alarm buzzer 55 for raising the alarm by sound when a burglary arises, a vibration sensor 56 for sensing an occurrence of burglary by sensing a vibration of the vehicle in a state where the engine operation is inhibited, and a crank angle sensor 57 for sensing the engine speed.

The ECU 3 includes fuel injection controller 31 as engine operation control unit that disables the engine operation by manipulating an actuator 71 for an ignition coil, an injector and a fuel pump on the basis of an operating state of the engine, and a power supply circuit 32 for supplying voltage from the battery 8 to this fuel injection controller 31. The fuel injection controller 31 is connected to various types of sensors (not shown) for sensing an intake air temperature, a water temperature and an intake air flow necessary for engine control and an overturning sensor 72 for sensing an overturning of the vehicle. Also, the ECU 3 and the immobilizer unit 2 are connected via the communication line 100 and bi-directionally communicated.

If the driver turns on a starter switch 42, a system relay 6 is driven to initiate the ECU 3. The system relay 6 is connected to the immobilizer controller 22 to constitute the engine operation restraining unit, like the fuel injection controller 31, to permit the engine operation on the basis of a collation result between the immobilizer controller 22 and the ECU 3. And if the engine operation is permitted, the immobilizer controller 22 enables the starter relay driving circuit 24 to initiate the starter relay 41 to start the starter 4.

Figure 3:
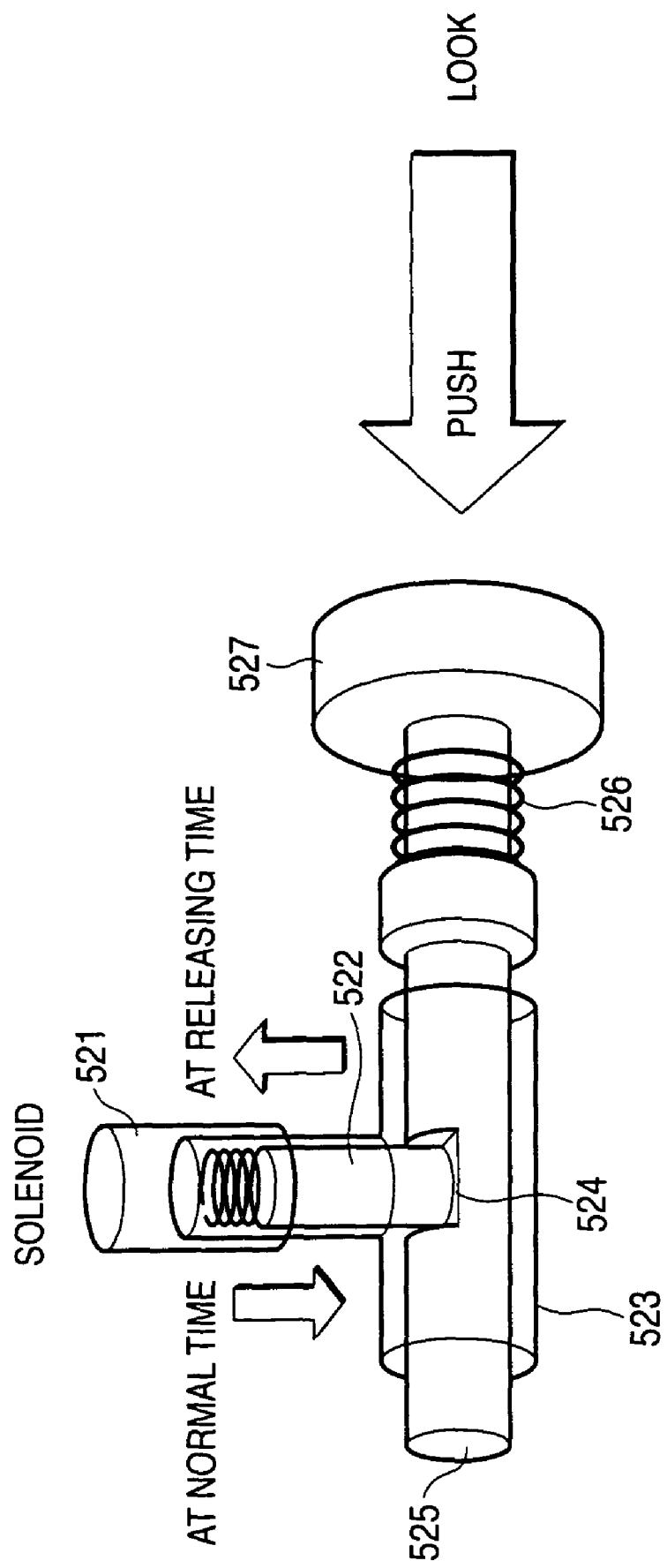
FIG. 3 is a typical view showing electromagnetic lock unit for use with the burglarproof device for vehicle according to the embodiment of this invention.

FIG. 3 is a typical view showing one example of the electromagnetic lock unit 52 (for two wheeler). In FIG. 3, a stopper 522 of an electromagnetic solenoid 521 is engaged by an engaging portion 524 of a lock bar 523 in a state where the handle is locked, an end portion 525 of the lock bar 523 engaging a rotational member of the steering wheel, not shown, to lock the steering wheel to be unrotatable.

If the driver presses the unlock button 12 of the portable transmitter 1 in this state, the first ID code for releasing the handle lock is sent and received by the receiving circuit 21 of the immobilizer unit 2. Then, the received first ID code is collated with the second ID code previously stored in the immobilizer controller 22. As a result of collation, if both the signals are matched, an electric power is supplied to the electromagnetic solenoid 521 to cause the stopper 522 engaged by the engaging portion 524 of the lock bar 523 to be disengaged in an arrow direction, so that the lock bar 523 is moved toward the handle lock button 527 due to a restoring force of a spring 526 to cause the end portion 525 to disengage from the handle rotating portion and unlock. Pressing the handle lock button 527 manually makes the handle lock.

Figure 4:
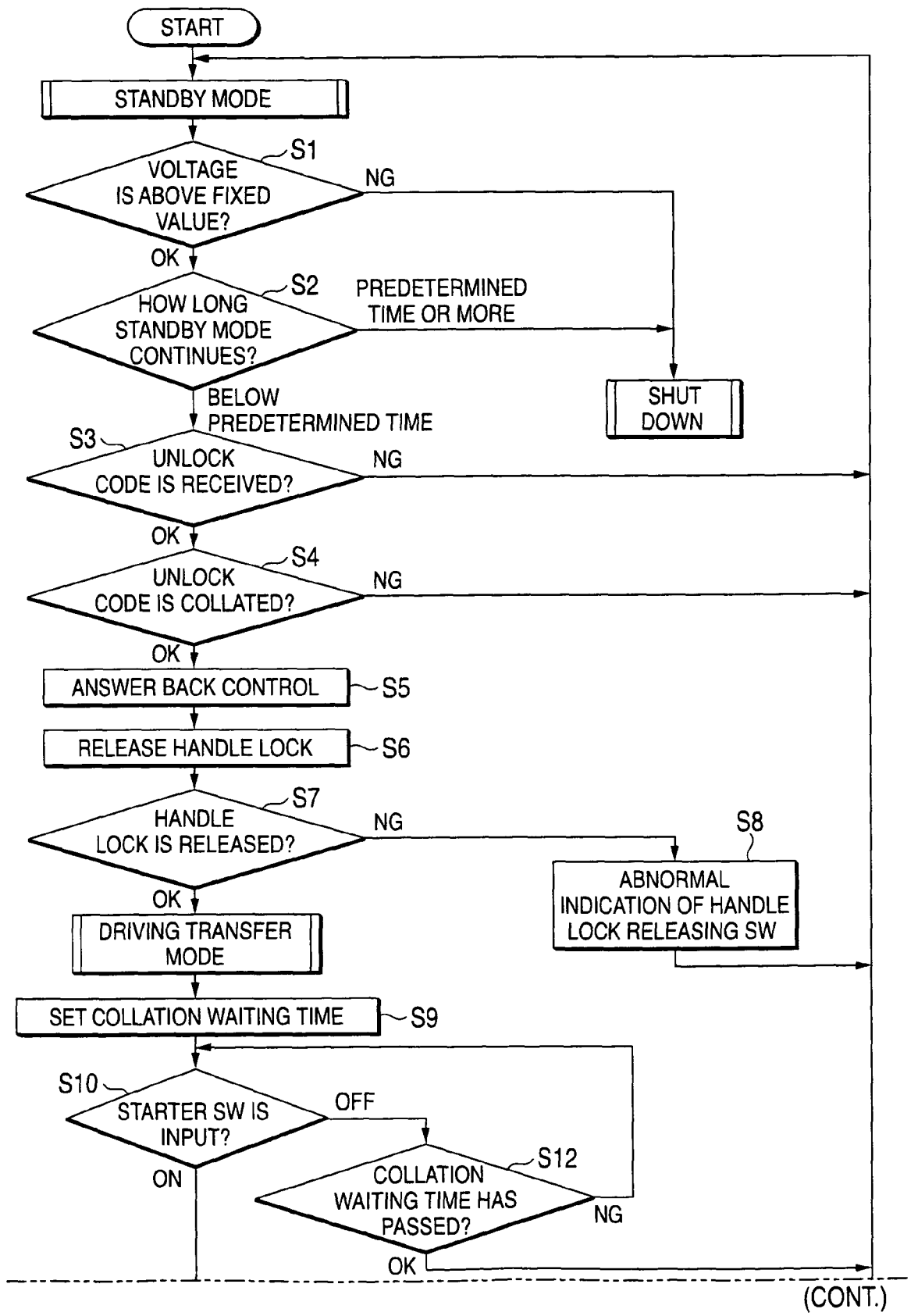
FIG. 4 is a flowchart showing the operation of the burglarproof device for vehicle according to the embodiment of this invention.

An operation from the time when the driver releases the handle lock to the time when starting the engine, namely, from a standby mode via a driving transfer mode to make a permission of engine operation will be described below. FIG. 4 is a flowchart showing the operation of the burglarproof device for vehicle according to the embodiment of this invention. In FIG. 4, first of all, a determination is made whether or not the voltage value of the battery 8 is greater than or equal to a fixed value (step S1). Since the engine is not started when the capacity of the battery 8 is insufficient, the operation is directly shut down if the voltage value of the battery 8 is less than the fixed value. If the voltage value is greater than or equal to the fixed value, a determination is made whether or not a duration of the standby mode for which the power of the immobilizer 2 is on is within a predetermined time (step S2).

If the duration exceeds the predetermined time, the operation is directly shut down for safety. If the duration is within the predetermined time, a determination is made whether or not the first ID code for releasing the handle lock that is transmitted upon the driver's pressing the unlock button 12 of the portable transmitter 1 is received by the receiving circuit 21 of the immobilizer unit 2 (step S3). If the first ID code is received, the first ID code is collated with the second ID code previously stored in the immobilizer controller 22 (step S4). If the first ID code is not received, the procedure returns to step S1.

As a result of collation, if both the signals are matched, an answer back control is made to inform the driver of the matched collation with the hazard relay 54 or the alarm buzzer 55 (step S5), the release of the handle lock is instructed (step S6), and then a determination is made by the handle lock releasing sensor 51 whether or not the electromagnetic lock unit 52 for locking or unlocking the handle is normally activated (step S7). If the electromagnetic lock unit 52 is normally activated and the released handle lock is confirmed, the operation is turned to the driving transfer mode. If the electromagnetic lock unit 52 is abnormally activated, the driver is warned with the display lamp 53 (step S8). Then, the operation returns to step S1.

Then, a collation waiting time between the immobilizer controller 22 and the ECU 3 is set (step S9). A determination is made whether or not the starter switch 42 is turned on by the driver (step S10). If the starter switch 42 is turned on, the system relay 6 is driven (step S11), and the ECU 3 is initiated (step S13). On the other hand, if the starter switch 42 is off, a determination is made whether or not the collation waiting time set at step S9 has passed (step S12). If the collation waiting time has not passed, the procedure returns to step S10. If the collation waiting time has passed, the driver has no intention to start the vehicle, and the procedure returns to step S1.

If the ECU 3 is initiated at step S13, it sends a question code via the communication line 100 to the immobilizer controller 22 (step S14). Then, a determination is made whether or not this question code is received by the immobilizer controller 22 (step S15). If the question code is received, a cipher key code is sent to the ECU 3 (step S16). On the other hand, if the question code is not received, the collation waiting time set at step S9 has passed (step S17). If the collation waiting time has not passed, the procedure returns to step S15. If the collation waiting time has passed, an abnormal initiation of the ECU 3 is warned with the display lamp 53 (step S18), judging that the ECU 3 is at fault, and thereby, the drive of the system relay 6 is stopped (step S19).

Then, a cipher key code sent from the immobilizer controller 22 at step S16 is received by the ECU 3 (step S20). If the cipher key code is received, the question code that is previously sent is collated with the cipher key code (step S21) On the other hand, if the cipher key code is not received, the procedure returns to step S20. If both the codes are matched at step S21, a response code is sent to the immobilizer controller 22 (step S22). On the other hand, if both the codes are unmatched, the procedure returns to step S20.

Then, a determination is made whether or not the response code sent from the ECU 3 at step S22 is received by the immobilizer controller 22 (step S23). If the response code is received, the engine operation is permitted (step S24) because a collation between the immobilizer controller 22 and the ECU 3 is completed. On the other hand, if the response code is not received, a determination is made whether or not the collation waiting time set at step S9 has passed (step S25). If the collation waiting time has not passed, the procedure returns to step S23. If the collation waiting time has passed, an abnormal reception of response code is warned with the display lamp 53 (step S26), judging that the ECU 3 is at fault, and the drive of the system relay 6 is stopped (step S19).

Figure 5:
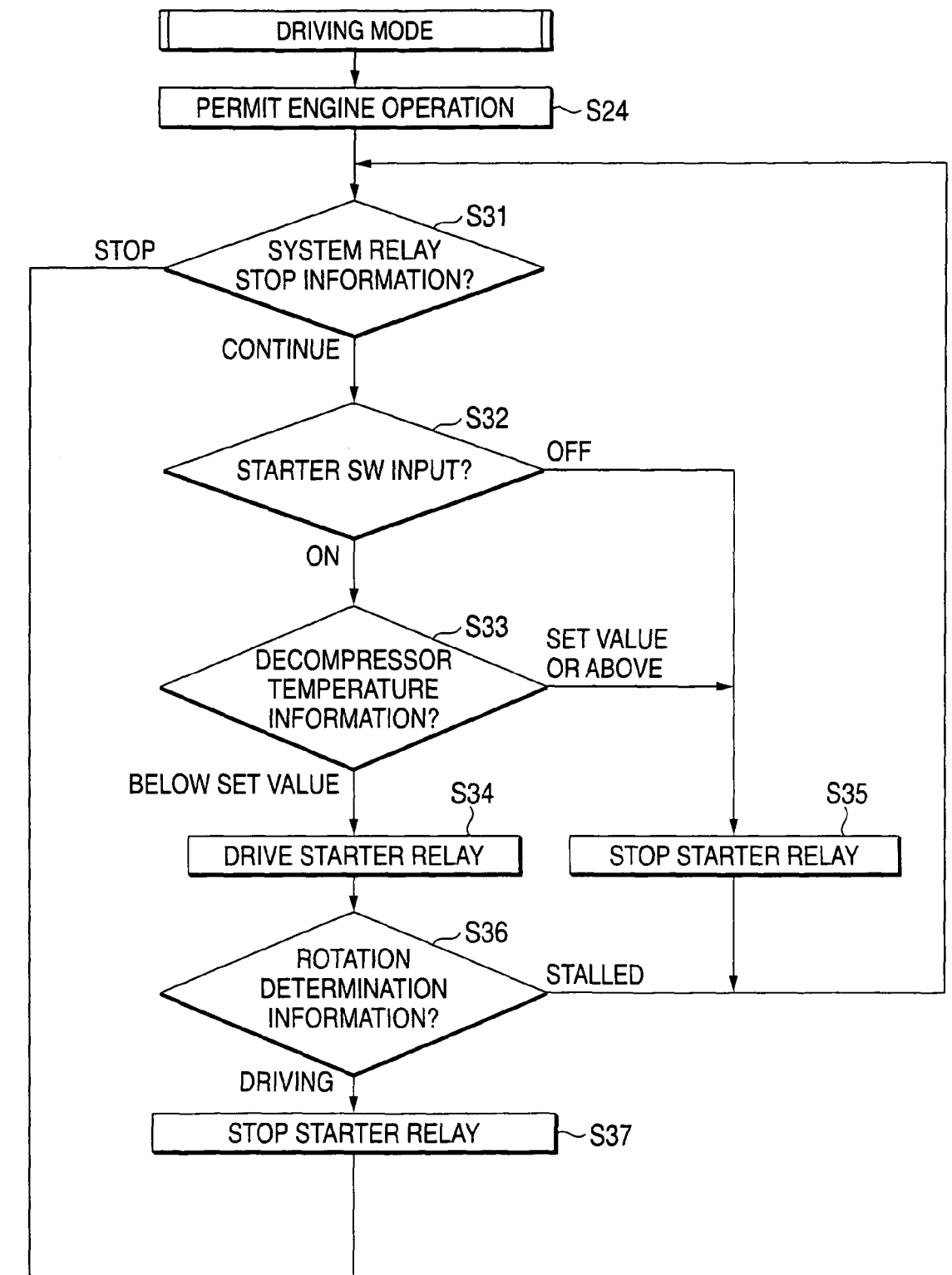
FIG. 5 is a flowchart showing the operation of the burglarproof device for vehicle according to the embodiment of this invention.

An operation of activating the engine from an engine operation permitted state (driving mode), and transiting to a standby mode will be described below. FIG. 5 is a flowchart showing the operation of the burglarproof device for vehicle according to the embodiment of this invention. In FIG. 5, first of all, the engine start is permitted (step S24). Then, a determination is made whether or not there is the stop information of the system relay 6 (step S31). Herein, the stop information of the system relay 6 is the information indicating that the engine is not activated in a fixed time after the engine operation is permitted. If there is the stop information of the system relay 6, the engine operation is disabled (step S45). The system relay 6 is turned off (step S46). The operation transits to the standby mode.

On the other hand, if there is no system relay off information at step S31, a determination is made whether or not the starter switch 42 is turned on (step S32). If the starter switch 42 is not turned on, the starter relay 41 is stopped (step S35). The procedure returns to step S31. If the starter switch 42 is turned on, a determination is made whether or not the temperature of a decompressor is higher than or equal to a predetermined value (step S33). If the temperature of the decompressor is below the predetermined value, the starter relay 41 is driven (step S34). If the temperature of the decompressor is higher than or equal to the predetermined value, the starter relay 41 is stopped to protect the decompressor (step S35). The procedure returns to step S31.

If the starter relay 41 is driven at step S34, a determination is made whether or not the engine is rotated from a signal of the crank angle sensor 57 (step S36). If the engine is rotated, the starter relay 41 is stopped (step S37). If the engine is stalled, the procedure returns to step S31.

In a state where the engine is operated in the above manner, a determination is made whether or not an overturning sensor 72 senses an overturning of the vehicle (step S38). If the overturning of the vehicle is sensed, the engine operation is disabled. Thereby, an actuator 71 is operated to shut off the ignition of the engine or the supply of fuel to the engine (step S45), the system relay 6 is turned off (step S46), and the operation transits to the standby mode. On the other hand, if the vehicle is not overturned, a determination is made whether or not there is any stop information of the system relay 6 (indicating that the engine is stalled for a predetermined time or more) (step S39). If there is any stop information, the engine start is disabled (step S45), the system relay 6 is turned off (step S46), and the operation transits to the standby mode.

If there is no stop information of the system relay 6, a determination is made whether or not a third ID signal sent by the driver's pressing the lock button 13 of the portable transmitter 1 is received by the receiving circuit 21 of the immobilizer unit 2 (step S40). If the third ID signal is received, the received third ID signal is collated with a fourth ID signal previously stored in the immobilizer controller 22 (step S41). If the third ID signal is not received, the procedure returns to step S38.

As a result of collation, if both the signals are matched, a determination is made whether or not the engine is rotated from a signal of the crank angle sensor 57 (step S42). If the engine is stalled, an answer back control for informing the driver with the hazard relay 54 or the alarm buzzer 55 is made (step S43), the engine operation is disabled (step S45), the system relay 6 is turned off (step S46), and the operation transits to the standby mode. On the other hand, if the engine is rotated, a determination is made whether or not the gear is neutral (step S44). If the gear is neutral, the answer back control is made (step S43), the start of engine is disabled, the actuator 71 is activated to shut off the ignition of engine or the supply of fuel to the engine (step S45), the system relay 6 is turned off (step S46), and the operation transits to the standby mode. If the gear is not neutral, the driver is still driving, and the procedure returns to step S38.

Figure 6:
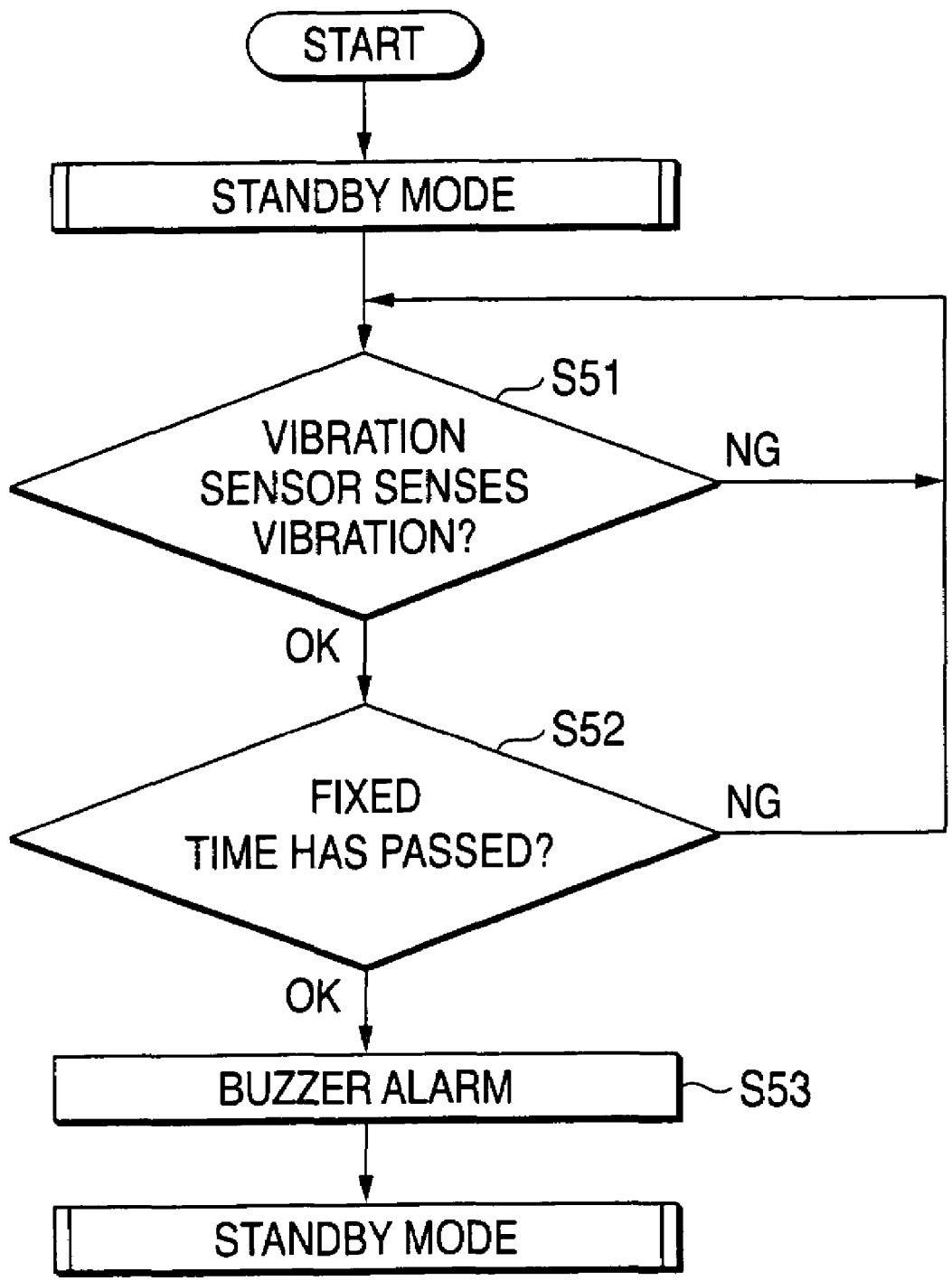
FIG. 6 is a flowchart showing the operation of the burglarproof device for vehicle according to the embodiment of this invention.

An alarm operation at the occurrence of burglary will be described below. FIG. 6 is a flowchart showing the alarm operation of the burglarproof device for vehicle according to the embodiment of this invention. This alarm operation is effected in an immobile mode where the engine operation is disabled. In FIG. 6, the burglar produces a vibration in making a burglary, and the immobilizer controller 22 determines whether or not the vibration sensor 56 senses the vibration (step S51). If the vibration is sensed, a determination is made whether or not the vibration continues for a predetermined time or more (step S52). If the vibration continues for a predetermined time or more, a warning is given with the alarm buzzer 55, judging that the burglary arises (step S53).

In this embodiment of the invention, the key and the key cylinder are dispensed with, and the portable transmitter 1 is employed to unlock, without taking a trouble of inserting the key into the key cylinder, whereby the release of handle lock, the engine operation permission, or inhibit can be simply made. Also, since there is no need for the action of inserting and turning the key into the key cylinder, the driver can make the release of handle lock, the engine operation permission or inhibit at a location away from the vehicle, employing the portable transmitter 1. A mechanical failure is prevented from being caused by inserting the key into the key cylinder.

Since the portable transmitter 1 performs unlocking, it is not possible to make a release of the handle lock or a permission of the engine operation, when the driver carries the portable transmitter 1. Hence, the burglary of the vehicle is prevented while the driver leaves the vehicle with the key inserted into the key cylinder.

Since there is no need for inserting the key into the key cylinder, the driver does not need to take an action of looking for the insertion hole of the key cylinder in the darkness in starting the engine at night, and thereby can easily make a release of the handle lock and start the engine. Also, it is unnecessary to take an expensive measure of installing a lamp on the key cylinder, whereby the system with low cost is provided.

Also, since the key cylinder is dispensed with, the design near the driver's seat is raised in the degree of freedom.

Also, since the electromagnetic lock unit 52 locks the handle that is an operational device for vehicle to be unrotatable, the burglarproof function is further reinforced.

Also, in a state where the engine operation is disabled by the immobilizer controller 22, the vibration sensor 56 senses a vibration of the vehicle at the time of burglary, to raise the alarm of light or sound with the hazard lamp or the alarm buzzer, whereby the driver and surrounding people are surely informed of an occurrence of burglary to enhance the burglarproof function.

Also, since the engine operation is disabled on the basis of a transit of the engine from the operating state to the stopped state, the restart of the engine is rapidly inhibited after the stop of the engine to enhance the burglarproof function.

Also, when the engine is stalled for a predetermined time or more since the engine operation is permitted, the system relay 6 disables the engine operation, whereby it is possible to prevent the burglary from arising when the driver leaves the vehicle for a short time immediately before the driving to enhance the burglarproof function.

In the above embodiment, the vehicle operation is restrained by locking the handle. However, the portable transmitter 1 may have the unlock button 12 and the lock button 13 to instruct a plurality of functions to the vehicle side, in which a cap of a fuel filler hole is locked by pressing the lock button 13 longer, or the fuel cap is unlocked by pressing the unlock button 12 longer. Thereby, it is possible to prevent the extraction of fuel by the burglar or the refill of new fuel.

Though some of the two wheelers can accommodate a baggage within the driver's seat, the opening or closing of the seat may be locked by pressing the lock button 13 longer, or unlocked by pressing the unlock button 12 longer, whereby the baggage accommodated within the seat is prevented to enhance the function as the immobilizer.

In the above embodiment, the burglarproof device of this invention is applied to the two wheeler. However, the burglarproof device may be applied to the vehicles propelled by the internal combustion engine such as a car, a marine vessel or a jet propelled ship.

As described above, with the present invention, the burglarproof device for vehicle includes a portable transmitter having a first switch for transmitting a preset first ID code, vehicle operational device activation determining unit for determining the activation of an operational device for vehicle by receiving the first ID code from the portable transmitter, collating the first ID code with a second ID code previously stored to permit the activation of an operational device for vehicle on the basis of a collation result, and engine operation restraining unit for permitting an engine operation on the basis of the collation result by the vehicle operational device activation determining unit, or disabling the engine operation on the basis of an operating state of the engine. Therefore, there is the effect that the release of handle lock, and the permission or inhibition of engine operation are simply performed.

What is claimed is:

1. A burglarproof device for a vehicle comprising:
a portable transmitter having a first switch which transmits a preset first ID code;
an activation unit for the vehicle which receives the first ID code from the portable transmitter and collates the first ID code with a prestored second ID code, such that a locked state of a vehicle operation device for the vehicle is released when the activation unit receives the first ID code; and
an engine operation restraining unit which disables an engine operation based on a signal from the activation unit,
wherein the signal from the activation unit is sent after the vehicle operation device has been released in response to the receipt of the first ID code by the activation unit, and
wherein the signal to disable the engine operation is sent by the activation unit if a time period between the release of the vehicle operation device by the activation unit and a detection of a start of the engine operation exceeds a first time period.

2. The burglarproof device for a vehicle according to claim 1, wherein the portable transmitter has a second switch for transmitting a preset third ID code, in which the activation unit receives the third ID code from the portable transmitter, and collates the third ID code with a prestored fourth ID code, such that the engine operation restraining unit disables the engine operation on the basis of the third ID code and the fourth ID code which are collated.

3. The burglarproof device for a vehicle according to claim 2, wherein the vehicle operation device is restrained by an electromagnetic lock unit.

4. The burglarproof device for a vehicle according to claim 1, further comprising:
an alarming unit for triggering an alarm by sensing a vibration of the vehicle when the engine operation is disabled by the engine operation restraining unit.

5. The burglarproof device for a vehicle according to claim 1, wherein the engine operation restraining unit stops the operation of the engine by shutting off an ignition of the engine or a supply of a fuel to the engine.

6. The burglarproof device for a vehicle according to claim 1, wherein the engine operation restraining unit disables the operation of the engine if the engine transits from an operating state to a stopped state.

7. The burglarproof device for a vehicle according to claim 1, wherein the portable transmitter includes a second switch, such that the first switch and the second switch respectively instruct the activation unit to send a signal to release the locked state of the vehicle operation device and send the signal to the engine operation restraining unit to disable the engine operation.

8. The burglarproof device for a vehicle according to claim 2, wherein the preset third ID code is transmitted after the vehicle operation device has been released.

9. The burglarproof device for a vehicle according to claim 1, wherein the vehicle operation device is a steering wheel.

10. The burglarproof device for a vehicle according to claim 1, wherein the vehicle operation device is a handle lock.

11. A method for preventing a burglary in a vehicle comprising:
transmitting a preset first ID code using a portable transmitter;
receiving the first ID using a receiver;
collating the first ID received by the receiver with a prestored second ID code prestored in the receiver, such that a locked state of a vehicle operation device for the vehicle is released when the receiver receives the first ID code; and
disabling an engine operation based on a signal representing a result of the collation,
wherein the signal representing the result is sent after the vehicle operation device has been released in response to the received first ID code, and
wherein the signal to disable the engine operation is sent by the activation unit if a time period between the release of the vehicle operation device by the activation unit and a detection of a start of the engine operation exceeds a first time period.

12. The method according to claim 11, further comprising:
transmitting a preset third ID code by a second switch of the portable transmitter;
receiving the third ID code from the portable transmitter by the receiver; and collating the third ID code with a prestored fourth ID code, such that the engine operation restraining unit disables the engine operation on the basis of the third ID code and the fourth ID code which are collated,
wherein the preset third ID code is transmitted after the vehicle operation device has been released.

13. The method according to claim 11, wherein the third ID code is transmitted from a controller to an engine control unit storing the prestored fourth ID code, wherein the engine control unit collates the third ID code with the fourth ID code and transmits a response to the controller.

14. The burglarproof device for a vehicle according to claim 1, wherein the first time period is a predetermined time period.

15. The method according to claim 11, wherein the first time period is a predetermined time period.

16. A burglarproof device for a vehicle comprising:
a portable transmitter having a first switch which transmits a preset first ID code;
an activation unit for the vehicle which receives the first ID code from the portable transmitter and collates the first ID code with a prestored second ID code, such that a locked state of a vehicle operation device for the vehicle is released when the activation unit receives the first ID code; and
an engine operation restraining unit which disables an engine operation based on a signal from the activation unit,
wherein the signal from the activation unit is sent after the vehicle operation device has been released in response to the receipt of the first ID code by the activation unit, and
wherein the transmission of the preset first ID code by the portable transmitter to the activation unit is a final communication between the portable transmitter and the activation unit that causes the activation unit to release the vehicle operation device and, after a predetermined time from the reception of the preset first ID code, the final communication further causes the activation unit to send the signal to the engine operation restraining unit to disable the engine operation.

17. The burglarproof device according to claim 16, wherein the signal to disable the engine operation is sent by the activation unit if a time period between the release of the vehicle operation device by the activation unit and a detection of a start of the engine operation exceeds the predetermined time period.

18. A method for preventing a burglary in a vehicle comprising:
transmitting a preset first ID code using a portable transmitter;
receiving the first ID using a receiver;
collating the first ID received by the receiver with a prestored second ID code prestored in the receiver, such that a locked state of a vehicle operation device for the vehicle is released when the receiver receives the first ID code; and
disabling an engine operation based on a signal representing a result of the collation,
wherein the signal representing the result is sent after the vehicle operation device has been released in response to the received first ID code, and
wherein the transmission of the preset first ID code by the portable transmitter to the activation unit is a final communication between the portable transmitter and the activation unit that causes the activation unit to release the vehicle operation device and, after a predetermined time from the reception of the preset first ID code, the final communication further causes the activation unit to send the signal to the engine operation restraining unit to disable the engine operation.

19. The method according to claim 18, wherein the signal to disable the engine operation is sent by the activation unit if a time period between the release of the vehicle operation device by the activation unit and a detection of a start of the engine operation exceeds the predetermined time period.

* * * * *